ated Dec. 23, 1958

2,865,883

POLYVINYL CHLORIDE WITH MANGANOUS PYROPHOSPHATE

Julius Jackson, Westfield, N. J., assignor to E. I. du Pont de Nemours and Company, Wilmington, Del., a corporation of Delaware No Drawing. Application June 29, 1955
Serial No. 518,944

15 Claims. (Cl. 260—45.75)

This invention relates to improved vinyl polymer compositions.

The use of polymers of vinyl chloride and related compositions in the manufacture of various types of plastic materials and in coating compositions is well known. Such compositions have particular value as unsupported films of substantial thickness, and they are widely used in applications which result in exposure to sunshine and the elements. It is also well known that such compositions require some form of stabilization or they will undergo marked changes in color and transparency during such exposure. For instance, unsupported films of transparent vinyl chloride polymer which have not been stabilized will become progressively darker on exposure to the sunlight until they ultimately become almost black and quite brittle. One theory is that the decomposition on heating or exposure to light results in the release of HCl and the best stabilizers have usually been substances which would react with the HCl thereby causing it to lose its identity. Substantially the same considerations apply in the use of vinyl polymer compositions as coating compositions.

Although the prior art has shown means by which vinyl chloride polymers may be stabilized to give products of excellent resistance on heating and exposure to light, products so stabilized have usually had some deficiencies, particularly in respect to color and transparency. Also, it has taken substantial amounts of the stabilizers and these have, in many cases, materially altered the properties of the plastic film. Thus, there has been a need for a substance which can be used to stabilize vinyl polymer compositions without introducing undesirable color and without significantly changing the transparency of the film. This substance should also be effective in amounts sufficiently small to result in no significant alteration in the properties of the film.

It is an object of this invention to prepare stable vinyl chloride polymers and copolymer compositions which can be exposed to heat and to sunlight without significant change in either the color or the transparency of the film. It is a further object to prepare stable polymeric vinyl chloride compositions both in unsupported films and in coating compositions.

The objects of this invention are accomplished by incorporating in the vinyl composition, prior to the formation of the film, a manganous pyrophosphate in a minor amount sufficient to inhibit the deterioration.

In the preferred embodiment of this invention, a manganous pyrophosphate pigment is prepared by reacting a manganous salt, such as manganous sulphate, with an alkali metal pyrophosphate such as tetrasodium pyrophosphate in substantially stoichiometrical proportions and isolating the resulting precipitate as a dry powder. This resulting white powder is then incorporated into a vinyl plastic composition together with the necessary plasticizers by suitable milling techniques, and the resulting composition is then sheeted at the desired thickness and handled in any desired manner for the formation of unsupported films or similar compositions. It is, of course, possible to use the manganous pyrophosphate as the sole stabilizer in a vinyl plastic, or it may be used in combination with other well known stabilizers. The amount of manganous pyrophosphate used may vary but the preferred usage is about 3% based on the weight of the polymer in the composition. In the ensuing description of this invention the amount of manganous pyrophosphate is expressed as parts by weight or percent by weight.

*Example 1*

A solution of manganous sulphate is prepared by dissolving 22 parts of $MnSO_4$ in 460 parts of water at about 80° C. and the pH of the solution is adjusted to 3.7–3.8 with sulphuric acid. A solution of 19.2 parts of tetrasodium pyrophosphate ($Na_4P_2O_7$) in 1120 parts of water at 50° C. is added to the manganous sulphate solution with good agitation over a period of about 20 minutes. With continued agitation, the resulting slurry is heated to about 80° C. and held at that temperature with agitation for about 30 minutes. It is observed that the pH after the reaction is about 4.5 and does not change during the heating period. The resulting manganous pyrophosphate is isolated by filtration, washing free of soluble salts and drying at about 60° C. About 24 parts of a white powder is obtained which, by analysis, shows a ratio of Mn to $P_2O_7$ of about 1.8.

*Example 2*

A typical vinyl plastic composition contains the following ingredients:

| | Parts |
|---|---|
| Vinyl chloride polymer having a molecular weight of 115,000 | 100 |
| Plasticizer-dioctyl phthalate | 50 |
| Manganous pyrophosphate of Example 1 | 3 |

It is necessary that the manganous pyrophosphate be thoroughly dispersed in the vinyl resin, but the manner by which this is done is not important. This dispersion may be easily accomplished by milling the pigment into the plasticizer in any convenient manner, as on a roller mill. The resulting dispersion of the manganous pyrophosphate in dioctyl phthalate is added to the vinyl chloride polymer and the mixture is thoroughly worked to uniformity in a plastic condition in any convenient manner, as on a hot two-roll mill. The plastic is then sheeted on a calender roll to any convenient thickness, and if desired, it may be press polished by heating between smooth surfaces under high pressure at temperatures in the order of 180° C.

*Example 3*

A vinyl plastic composition containing the following ingredients is prepared in the manner described in the above paragraph.

| | Parts |
|---|---|
| Vinyl chloride polymer (Geon 101) | 100 |
| Plasticizer—dioctyl phthalate | 50 |
| Manganous pryophosphate of Example 1 | 3 |

*Example 4*

A vinyl plastic composition is prepared as in Example 3 except that a typical commercial stablizer comprising a barium-cadmium salt of a fatty acid is added in an amount of about 3% in addition to the 3% of manganous pyrophosphate.

For purposes of comparison in exposure tests, the following examples have also been prepared.

*Example 5*

A vinyl plastic composition is made as in Example 3 but containing only the vinyl chloride polymer and the plasticizer without any stablizer present.

*Example 6*

A similar composition is made containing the vinyl chloride polymer, the plasticizer and 3% of the commercial stablizer used in Example 4.

The polyvinyl chloride of the molecular weight shown in the specific example above is for illustrative purposes only, and it should be understood that any polyvinyl chloride suitable for the production of either unsupported films or coating compositions is contemplated as being within the scope of this invention.

Plastic sheetings made according to Examples 3 to 6 inclusive are substantially colorless and exhibit a very high degree of transparency which is not significantly affected by the presence of either the commercial stabilizer or the manganous pyrophosphate of this invention. Sheets of plastic composition made according to these examples have been exposed to the elements for eight months in New Jersey at an angle of 45° from the vertical, facing south. At the end of such an exposure period, the unstabilized product of Example 5 was very dark, almost black in color and very stiff and leathery in physical properties. The product of Example 6, using the commercial stabilizer, was substantially like that of Example 5, and it must be concluded that this stabilizer is completely ineffective in preventing the serious changes which have occurred on exposure to sunlight and the elements. The product of Example 3, containing manganous pyrophosphate as the only stabilizer, retained most of its original transparency and freedom from color although there was some tendency to discoloration where the product was in contact with the support. The flexibility and general physical appearance of the film were substantially the same as when it was originally exposed. Finally, the product of Example 4 containing both manganous pyrophosphate and the commercial stabilizer was completely free from any evidence of either discoloration, increased opacity, or any change in the physical properties of the plastic film.

In another series of tests, products similar to that of Example 3 were used except that the manganous pyrophosphate content varied from about 0.1% up to about 10%. There is some evidence of improvement with 0.1% and the product containing 1% of manganous pyrophosphate was quite good in its freedom from change. Products containing from 3 to 10% appeared to be completely stabilized.

Solutions of vinyl resins, sometimes polyvinyl chloride alone and sometimes polyvinyl chloride combined with polyvinyl acetate, in organic solvents have frequently been used as vehicles for paints and similar coating compositions. Like the polyvinyl chloride polymer sheeting, many such compositions have shown poor durability when used on surfaces which are exposed to the elements. The durability is frequently very much enhanced by the addition of colored pigments, but it has not been possible heretofore to use such compositions as clear varnishes. It is now found that pigmentation of such vehicles with about 10% of manganous pyrophosphate based on film solids results in compositions usable as clear varnishes. These coatings are substantially transparent, and they show markedly improved durability on outdoor exposure. The preferred pigmentation for such purposes is in the range of 10 to 20%, but improved results are obtained in the wider range of from about 2 to about 30% manganous pyrophosphate based on the nonvolatile portion of the system.

The following example is illustrative of such a finish:

*Example 7*

A vinyl paint comprises the following ingredients:

| | Parts |
|---|---|
| Manganous pyrophosphate pigment of Example 1 | 15 |
| Co-polymer of about 86% vinyl chloride and 13% vinyl acetate | 100 |
| Dioctyl phthalate | 30 |
| Castor oil | 2 |
| Barium/cadmium salt of ricinoleic acid | 3 |
| Thinner (50% ketone, 50% aromatic hydrocarbons) | 672 |

Such a paint may be prepared in any convenient manner. For instance, the pigment and a portion of the plasticizers and stabilizer may be thoroughly wet with a portion of the solvent. Then, part of the resin as a 20% solution is added, and the mixture ground in a ball mill for three days. The remaining ingredients are then added and thoroughly mixed. Although the amount of solvent specified is typical, it is not critical and may vary appreciably to give the desired viscosity for application usually by spraying.

After a prolonged outdoor exposure, panels coated with this clear finish show superior durability in comparison with comparable finishes not containing the manganous pyrophosphate pigment.

Vinyl chloride polymers and copolymers are well known commercial products which are sold under various trade names. Examples of such materials which are suitable in this invention are disclosed on page 441 of "Vinyl and Related Polymers" by Schildknecht, 1952. It is usually customary to incorporate plasticizers into the polymeric vinyl chloride compositions, and the dioctyl phthalate disclosed in Example 2 is widely used. Other suitable plasticizers which may be present are disclosed on page 427 of the above mentioned "Vinyl and Related Polymers." It is also common practice in the trade to use mixtures of stabilizers, and the pyrophosphates of this invention may be used in conjunction with known stabilizers such as barium ricinoleate, strontium naphthenate, dibutyl tin oxide, and basic lead salts, of which white lead is an example.

Manganous pyrophosphates are well known in the art although their specific chemical structures are sometimes difficult to determine. Basset, et al., discusses these materials in the "Chemical Society Journal," 1936, part II. For purposes of this invention, manganous pyrophosphates in which the ratio of manganous ions to pyrophosphate ions ranges from about 1.3:1 to about 1.8:1 are preferred.

It has already been pointed out that the amount of manganous pyrophosphate incorporated into an unsupported sheet varies over a substantial range; specifically from about 1% to about 10% based on the amount of vinyl chloride resin used. The preferred amount seems to be in the range of about 3% to 5%. When used as a stabilizing pigment in polyvinyl chloride coating compositions, manganous pyrophosphate is used in the range of 5 to 30% of the vinyl chloride polymer with the smaller range of 10% to 20% preferred.

The manganous pyrophosphates of this invention may be used as stabilizers for compositions which contain the polymeric vinyl chloride in admixture with other resins; for example, when the polymeric vinyl chloride comprises a portion of the vehicle in a coating composition.

Polyvinyl chloride compositions containing manganous pyrophosphate as the stabilizer offer a number of advantages over products stabilized by prior art compositions. They are, in general, more transparent than many of the prior art stabilizers, particularly those comprising heavy metal salts. They are much less toxic than salts of lead or barium which have been widely used heretofore. They are potentially much lower in cost than some of the compounds which have been proposed, such as the metallo-organic compounds. Furthermore, manganous pyrophosphate appears to be a markedly more effective stabilizer than some of the widely used commercial stabilizers such as the barium-cadmium fatty acid types.

It is contemplated that vinyl plastic compositions, both sheeting and coating compositions, containing manganous pyrophosphate as the stabilizer will make possible the use of such compositions as clear films in outdoor service. This will fill a need not adequately met heretofore with any known compositions. It is, of course, possible to add colored pigments to these compositions and thus obtain colored films of excellent durability.

I claim:

1. A polymeric vinyl chloride composition comprising a polymeric vinyl chloride and a manganous pyrophosphate in a minor amount sufficient to stabilize said polymeric vinyl chloride against deterioration.

2. A polymeric vinyl chloride composition comprising a polymeric vinyl chloride and a manganous pyrophosphate in a minor amount sufficient to stabilize the polymeric vinyl chloride against deterioration, said pyrophosphate having a ratio of manganous ions to pyrophosphate ions ranging from about 1.3:1 to about 1.8:1.

3. A polymeric vinyl chloride composition comprising a polymeric vinyl chloride and a manganous pyrophosphate in a minor amount sufficient to stabilize said polymeric vinyl chloride against deterioration, said manganous pyrophosphate being prepared by reacting an inorganic manganous salt with an alkali metal pyrophosphate.

4. A polymeric vinyl chloride composition comprising a polymeric vinyl chloride and a manganous pyrophosphate in a minor amount sufficient to stabilize said polymeric vinyl chloride against deterioration, said manganous pyrophosphate being prepared by reacting an inorganic manganous salt with an alkali metal pyrophosphate and having a ratio of manganous ions to pyrophosphate ions ranging from about 1.3:1 to about 1.8:1.

5. An unsupported polyvinyl chloride film comprising polyvinyl chloride, a plasticizer, and from 1 to 10% by weight, based on the polyvinyl chloride, of a manganous pyrophosphate.

6. The composition of claim 5 in which the amount of manganous pyrophosphate is from about 3 to 5%.

7. An unsupported polyvinyl chloride film comprising polyvinyl chloride, a plasticizer, and from about 1 to 10% by weight, based on the polyvinyl chloride, of a manganous pyrophosphate having a ratio of manganous ions to pyrophosphate ions ranging from about 1.3:1 to about 1.8:1.

8. An unsupported polyvinyl chloride film comprising polyvinyl chloride, a plasticizer, and from about 1 to 10% by weight, based on the polyvinyl chloride, of a manganous pyrophosphate prepared by reacting an inorganic manganous salt with an alkali metal pyrophosphate and having a ratio of manganous ions to pyrophosphate ions ranging from about 1.3:1 to about 1.8:1.

9. The composition of claim 8 in which the amount of manganous pyrophosphate is from about 3 to 5%.

10. A polymeric vinyl chloride coating composition comprising a polymeric vinyl chloride, a plasticizer, and from about 2 to 30% by weight, based on the polymeric vinyl chloride, of a manganous pyrophosphate.

11. The composition of claim 10 in which the amount of manganous pyrophosphate is from about 10 to 20%.

12. A polymeric vinyl chloride coating composition comprising polymeric vinyl chloride, a plasticizer, and from about 2 to 30% by weight based on the polymeric vinyl chloride, of a manganous pyrophosphate having a ratio of manganous ions to pyrophosphate ions ranging from about 1.3:1 to about 1.8:1.

13. A polymeric vinyl chloride coating composition comprising polymeric vinyl chloride, a plasticizer, and from about 2 to 30% by weight, based on the polymeric vinyl chloride, of a manganous pyrophosphate prepared by reacting an inorganic manganous salt with an alkali metal pyrophosphate and having a ratio of manganous ions to pyrophosphate ions ranging from about 1.3:1 to about 1.8:1.

14. The composition of claim 13 in which the amount of manganous pyrophosphate ranges from about 10 to 20%.

15. A polymeric vinyl chloride composition comprising a polymeric vinyl chloride, a stabilizer for said polymeric vinyl chloride, and from about 1 to 30% by weight, based on the polymeric vinyl chloride, of a manganous pyrophosphate.

References Cited in the file of this patent

UNITED STATES PATENTS

| | | |
|---|---|---|
| 2,075,543 | Reed et al. | Mar. 30, 1937 |
| 2,140,518 | Doolittle | Dec. 20, 1938 |
| 2,477,658 | Schaefer | Aug. 2, 1949 |
| 2,507,142 | Chaban | May 9, 1950 |
| 2,597,987 | Harding | May 27, 1952 |
| 2,604,459 | Jankowiak | July 22, 1952 |

OTHER REFERENCES

Pauling: General Chemistry, page 200, published by MacKenzie and Harris, 1947.